(12) United States Patent
Jonsson et al.

(10) Patent No.: US 7,715,464 B2
(45) Date of Patent: May 11, 2010

(54) POSITIONING OF A PATH SEARCHER WINDOW IN A CDMA RECEIVER

(75) Inventors: Elias Jonsson, Malmö (SE); Roger Persson, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 938 days.

(21) Appl. No.: 10/595,115

(22) PCT Filed: Jul. 10, 2004

(86) PCT No.: PCT/EP2004/007626

§ 371 (c)(1),
(2), (4) Date: Aug. 16, 2006

(87) PCT Pub. No.: WO2005/020458

PCT Pub. Date: Mar. 3, 2005

(65) Prior Publication Data

US 2007/0195864 A1 Aug. 23, 2007

Related U.S. Application Data

(60) Provisional application No. 60/500,413, filed on Sep. 5, 2003.

(30) Foreign Application Priority Data

Aug. 26, 2003 (EP) .................................. 03388056

(51) Int. Cl.
*H04B 1/00* (2006.01)

(52) U.S. Cl. ................. 375/148; 375/324; 375/343; 375/349; 375/142; 375/144; 370/342; 370/320; 370/335; 370/508

(58) Field of Classification Search ............. 375/137, 375/142, 144, 148, 152, 324, 343, 349; 370/342, 370/320, 335, 441, 508, 519
See application file for complete search history.

(56) References Cited

U.S. PATENT DOCUMENTS 6,370,397 B1 * 4/2002 Popovic et al. ............... 455/561

(Continued)

FOREIGN PATENT DOCUMENTS

EP 1033823 A 9/2000

(Continued)

*Primary Examiner*—David C Payne
*Assistant Examiner*—Rahel Guarino
(74) *Attorney, Agent, or Firm*—Michael G. Cameron

(57) ABSTRACT

Multipath components of signals transmitted through time-varying digital radio channels are received with individual delays, and signals through a given channel comprise a code identifying that channel. A delay profile indicating a magnitude (Y) for delay values in a search window is calculated repetitively for known channels; the delays of multipath components for known channels estimated; a signal strength indicator calculated; and a search for new multipath components not already estimated performed at regular time intervals. When a new multipath component is found, its identification code is compared to the codes of the known channels. If the code of the new component is identical to the code of a known channel, a delay profile and a signal strength indicator is calculated for a window transposed to include the new multipath component. In this way as many multipath components as possible are included in the search window for a new cell.

6 Claims, 6 Drawing Sheets

| U.S. PATENT DOCUMENTS | | | | WO | WO01/76088 A | 10/2001 |
|---|---|---|---|---|---|---|
| 2001/0014116 A1* | 8/2001 | Saito et al. | 375/148 | | | |
| 2003/0083014 A1* | 5/2003 | Li et al. | 455/63 | | | |

FOREIGN PATENT DOCUMENTS

| EP | 1052783 A | 11/2000 |
|---|---|---|

* cited by examiner

POSITIONING OF A PATH SEARCHER WINDOW IN A CDMA RECEIVER

This application claims the benefit of U.S. Provisional Application No. 60/500,413, filed Sep. 5, 2003, the disclosure of which is fully incorporated herein by reference.

TECHNICAL FIELD OF THE INVENTION

The invention relates to a method of detecting multipath components in time-varying fading radio channels in a digital wireless communications system in which individual multipath components of a signal transmitted through a channel are received with individual delays within a range of possible delay values, and in which signals transmitted through a given channel comprise an identification code identifying that channel. The method comprises the steps of calculating repetitively for each of a number of known channels a delay profile indicating a magnitude for each of a number of individual delay values in a search window constituting a subset of said range of possible delay values and being positioned based on at least one previously calculated delay profile for the corresponding channel; estimating from said delay profiles the delays of multipath components for each known channel; calculating from said delay profiles a signal strength indicator for each known channel; and searching at regular time intervals for new multipath components that are not already estimated from one of said delay profiles. The invention further relates to a receiver having means for detecting multipath components in a time-varying fading radio channel, and a corresponding computer program and a computer readable medium.

DESCRIPTION OF RELATED ART

In wireless communications systems the physical channel between a transmitter and a receiver is typically formed by a radio link. As an example, the transmitter could be a base station, and the receiver could be a mobile station, or vice versa. In most cases the transmit antenna is not narrowly focused towards the receiver. This means that the transmitted signals may propagate over multiple paths. In addition to a possible direct path from the transmitter to the receiver, many other propagation paths caused by reflections from objects in the surroundings exist. Thus, the receiver may receive multiple instances of the same signal at different times, i.e. with different delays, because different portions of the signal are reflected from various objects, such as buildings, moving vehicles or landscape details.

These different portions of the signal are a cause of interference in the receiver. Depending on the time resolution of the transmission system and the instantaneous phase relationship, portions with similar propagation distances combine at the receiver and form a distinct multipath component. The effect of the combining depends on the instantaneous relationship of the carrier wavelength and distance differences, and it may thus for a given multipath component be either enhancing or destructive. In case of destructive interference, the combining leads to significant decrease of the magnitude, or fading, of the path gain for that path.

This interference is treated differently in different transmission systems. Many transmission systems try to reduce the effect of multipath propagation and fading by using receivers that combine the data symbol energy from all multipath components. In Code Division Multiple Access (CDMA) and Wideband Code Division Multiple Access (WCDMA) systems the energy of the different received portions of the signal may be utilized in the receiver by using a so-called RAKE receiver.

In these systems spreading and despreading are used. Data are transmitted from the transmitter side using a spread spectrum modulation technique wherein the data are scattered across a wide range of frequencies. Each channel is assigned a unique spreading code that is used to spread the data across the frequency range. The spreading code is a pseudo-random noise (PN) code and is composed of e.g. a binary sequence of 1's and 0's, called "chips", that are distributed in a pseudo-random manner and have noise-like properties. The number of chips used to spread one data bit, i.e. chips/bit, may vary, and it depends, at least in part, on the data rate of the channel and the chip rate of the system.

In the receiver the received signal must be despread and demodulated with the same spreading code using the same chip rate to recover the transmitted data. Furthermore, the timing of the demodulation must be synchronized, i.e. the despreading code must be applied to the received signal at the correct instant in time, which can be difficult due to the multipath effects mentioned above. The performance of a CDMA receiver is improved if the signal energy carried by many multipath components is utilized. This is achieved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate.

Thus the RAKE receiver requires knowledge of the multipath delays and the values of the channel impulse response for all paths.

The structure of the propagation channel, i.e. the absolute and relative delays of the individual multipath components, does not remain constant over time. Due to relative movement of the transmitter, the receiver and the objects in their vicinity, the delays of existing paths change, old paths disappear and new paths appear. In addition, the frequency offset between the transmitter and receiver circuits gives rise to a slow clock drift, which manifests itself as a gradual movement of the whole delay profile along the time axis. To ensure proper operation of the RAKE receiver, the changing delays of all known multipath components should be tracked, and new paths should be discovered quickly after they appear. This is typically achieved by means of a path searcher.

The impulse response of a channel may be evaluated by transmitting a known pilot signal which is then despread and demodulated in the receiver. In e.g. a WCDMA network the Common Pilot Channel (CPICH) may be used. In the receiver the received signal is correlated with the scrambling code for the cell and the CPICH channelization code, i.e. the CPICH symbols are despread and then accumulated. This is done for a given number of time delays. The strength of the accumulated signal for a given delay reflects the power contained at this time-delay. If it is judged to be higher than a specified noise floor, we say that it represents a multi-path. Typical implementations may use path searchers with observation windows shorter than the full search area. A typical path searcher window is a set of equally spaced delay values covering a time span of 80-160 chips. By evaluating the impulse response of the channel over this search window, the part of a delay profile for the channel covered by the window is calculated. The calculated delay profile may then be subjected to peak detection and the peak locations can be reported to the RAKE receiver as the multipath delay estimates. The peak locations are also used for positioning subsequent search windows. Further, signal strength indicators may also be deduced from the delay profile.

When a general delay estimation algorithm is used, which is able to extract the path positions and find their delays with sufficient accuracy once they are discovered by the path searcher, the path searcher window must be positioned so that new paths will be included in the window. Since new paths will, with high probability, appear in the vicinity of the currently known paths in terms of their delays, although it is not known exactly where, the prevalent criterion of placing the path searcher window is usually to cover the currently known paths.

As mentioned, a suitable position for the path searcher window must be determined. A typically used method for determining a suitable path searcher window position for the next path search activation is based on computing the center of gravity (COG), also known as the mean excess delay, of the presently known power delay profile estimate. Given the center of gravity estimate, the path searcher window is placed so that most of the channel power would be covered by the window. Typically, the center of gravity estimate is used as the center position of the path searcher window, but the window may also be positioned asymmetrically around the center of gravity estimate.

The wireless communications systems described above are typically arranged as cellular systems, so that a mobile station or user equipment does not only communicate with one base station or cell through a multipath channel. Instead the user equipment may communicate with, or be connected to, several cells through a corresponding number of multipath channels. When a user equipment is moving around, it will be necessary to continuously change the set of cells that the user equipment is connected to. The user equipment will only use the cells from which the strongest signals are received. To ensure that this is the case, two tasks have to be performed, i.e. the signal strength received from already known cells must be monitored, and new cells must be detected. A path searcher as described above is commonly used to monitor the signal strength from a known cell, while a cell searcher may be used for the detection of new cells. It is noted that the path searcher now has to operate with a path searcher window for each cell that is presently known to the receiver, and it also has to calculate a delay profile and the multipath delays for each of these windows.

The cell search utilizes different codes transmitted by all cells. In e.g. a WCDMA network the CPICH includes a primary synchronization code and a scrambling code. The primary synchronization code is the same for all cells, and it is known to the receiver, while each cell has its own unique scrambling code, which identifies the cell. The cell search correlates the known primary synchronization code against the received signal in order to find a slot boundary for a new cell. For a given multipath delay profile for the transmission channel from a new cell, the cell searcher will lock onto one of the multipath components of this profile and deliver the delay of this multipath component as an indication of a new cell to the path searcher. The path searcher will then include the new cell in its operation. There is no guarantee that the cell searcher will not detect the slot boundary of an already known cell. To avoid this situation, the delay locations of the multipath components for the already known cells may be excluded, so that the cell searcher only looks for multipath components that are not already estimated from one of the delay profiles calculated for the known cells. The cell searcher also determines the scrambling code of the new cell.

When the path searcher receives the delay value indicating a new cell from the cell searcher, a path searcher window will be centred on this delay, and the position of the path searcher window will then be updated using one of the methods described above, e.g. the center of gravity method in which a center of gravity for the delay profile is computed (and maybe filtered) and the window positioned around the computed center of gravity.

However, when the spacing between the multipath delays of the transmission channel from the new cell is large, it may be difficult or impossible to position the search window so that all clusters of energy in the delay profile are included. E.g. there may be two delays spaced 80 chips apart, and the path searcher window may be 100 chips long. If the cell searcher finds the first delay, the search window will be centred over this delay, and the other delay will then not be included. This means that also subsequent window positions will be wrong because they will continue to be centred at the first delay. More importantly, the signal strength from this cell will be reported erroneously because a substantial part of the energy transmitted from the base station of this cell is lost.

Thus there is a need for a better way of updating the path searcher window position after the detection of a new cell by the cell searcher. One way could be to place the path searcher window position at different locations and then weight the different locations to find an optimal position. However, several positions have to be considered before an optimal position can be found. This means that a high number of calculations are needed, and it also takes some time before the optimal position can be found.

Another way is to use several small disjoint path searcher windows for each cell. Complicated algorithms are then used to keep track of all windows, and therefore this method requires complex hardware support and a considerable memory consumption. Thus in this solution the overhead for keeping track of all the path searcher windows and updating them appropriately will typically be prohibitive. One example of a method using a combination of small disjoint sub-windows is known from EP 1 126 627 in which a search is conducted in one sub-window at a time, and when all sub-windows are searched the results are combined.

Therefore, it is an object of the invention to provide a method of detecting multipath components that is able to position a search window in such a way that as many multipath components as possible are included in the window for a transmission channel from a newly detected cell, so that the signal strength from a new cell can be reported correctly. At the same time it shall be a low complexity method with a small memory consumption.

SUMMARY

According to the invention the object is achieved in that the method further comprises the steps of comparing, when a new multipath component is found, the identification code of the new multipath component to the identification codes of said known channels; and calculating, if the identification code of the new multipath component is identical to the identification code of one of the known channels, a delay profile and a corresponding signal strength indicator for a transposed window obtained by transposing the search window of that known channel to include said new multipath component.

Since the cell search searches for new multipath components that are not already estimated by the path searcher for the known cells, it will continue to find the same cell again if one or more components of a new cell is not included in the search window for that cell. From the identification code (e.g. the scrambling code) it can be seen that the found cell is already known. Thus, if a known cell is found again by the cell searcher, it indicates that at least one multipath component from that cell is located outside the corresponding search window, or with other words that the search window for that cell might not be positioned correctly. It will thus be possible to move the search window to a position where the multipath component last detected by the cell searcher is included in the window and then calculate a delay profile and a strength indicator for this window position. The result of this calculation indicates whether it would be advantageous to use this window position in the further calculations.

When the method further comprises the step of replacing the signal strength indicator calculated for that known channel by the signal strength indicator calculated for the transposed window, it is ensured that the new multipath component is included in the signal strength indicator reported for that channel. When the method further comprises the step of replacing the search window for that known channel by the transposed window, it is also ensured that the new multipath component will be included in future delay profiles and search windows, because they will be centred around the center of gravity for the transposed window.

Alternatively, the method may further comprise the steps of comparing the signal strength indicator calculated for that known channel to the signal strength indicator calculated for the transposed window, and replacing, if the signal strength indicator calculated for the transposed window is larger than the signal strength indicator calculated for that known channel multiplied by a factor, the signal strength indicator for that known channel by the signal strength indicator for the transposed window. This ensures that the optimal value of the signal strength indicator is selected, also in the case where the transposed window does not provide a better value. When the factor equals one, the larger of the two signal strength indicators is selected. When the method further comprises the step of replacing, if the signal strength indicator for that known channel is replaced by the signal strength indicator for the transposed window, the search window for that known channel by the transposed window, it is also ensured that future delay profiles and search windows will be based on the better of the two windows.

When the method further comprises the steps of calculating a signal strength indicator for the transposed window a number of times; calculating a filtered signal strength indicator from said number of calculated signal strength indicators; and using said filtered signal strength indicator as the signal strength indicator calculated for the transposed window, it is ensured that very short noise spikes are not erroneously detected as paths, because they are filtered out.

Expediently, the method further comprises the steps of calculating a center of gravity for said previously calculated delay profile; and positioning the search window around said calculated center of gravity.

In an expedient embodiment, multipath components calculated for the transposed window are considered as already estimated in the step of searching at regular time intervals for new multipath components that are not already estimated from one of said delay profiles. In this way it is avoided that the same new multipath component is detected again and again while it is already being processed.

The digital wireless communications system may expediently be a Wideband Code Division Multiple Access system, and in this case the identification code may be a scrambling code for a Common Pilot Channel in the Wideband Code Division Multiple Access system.

As mentioned, the invention further relates to a receiver having means for detecting multipath components in time-varying fading radio channels in a digital wireless communications system in which individual multipath components of a signal transmitted through a channel are received with individual delays within a range of possible delay values, and in which signals transmitted through a given channel comprise an identification code identifying that channel. The receiver is adapted to calculate repetitively for each of a number of known channels a delay profile indicating a magnitude for each of a number of individual delay values in a search window constituting a subset of said range of possible delay values and being positioned based on at least one previously calculated delay profile for the corresponding channel; estimate from said delay profiles the delays of multipath components for each known channel; calculate from said delay profiles a signal strength indicator for each known channel; and search at regular time intervals for new multipath components that are not already estimated from one of said delay profiles.

When the receiver is further adapted to compare, when a new multipath component is found, the identification code of the new multipath component to the identification codes of said known channels; and calculate, if the identification code of the new multipath component is identical to the identification code of one of the known channels, a delay profile and a corresponding signal strength indicator for a transposed window obtained by transposing the search window of that known channel to include said new multipath component, a receiver is provided that is able to position a search window in such a way that as many multipath components as possible are included in the window for a transmission channel from a newly detected cell, so that the signal strength from a new cell is reported correctly. At the same time the receiver has a low complexity with a small memory consumption.

When the receiver is further adapted to replace the signal strength indicator calculated for that known channel by the signal strength indicator calculated for the transposed window, it is ensured that the receiver can include the new multipath component in the signal strength indicator reported for that channel. When the receiver is further adapted to replace the search window for that known channel by the transposed window, it is also ensured that the receiver can include the new multipath component in future delay profiles and search windows, because they will be centred around the center of gravity for the transposed window.

Alternatively, the receiver may further be adapted to compare the signal strength indicator calculated for that known channel to the signal strength indicator calculated for the transposed window, and replace, if the signal strength indicator calculated for the transposed window is larger than the signal strength indicator calculated for that known channel multiplied by a factor, the signal strength indicator for that known channel by the signal strength indicator for the transposed window. This ensures that the receiver can select the optimal value of the signal strength indicator, also in the case where the transposed window does not provide a better value. When the factor equals one, the larger of the two signal strength indicators can be selected. When the receiver is further adapted to replace, if the signal strength indicator for that known channel is replaced by the signal strength indicator for the transposed window, the search window for that known channel by the transposed window, it is also ensured that the receiver can base future delay profiles and search windows on the better of the two windows.

When the receiver is further adapted to calculate a signal strength indicator for the transposed window a number of times; calculate a filtered signal strength indicator from said number of calculated signal strength indicators; and use said filtered signal strength indicator as the signal strength indicator calculated for the transposed window, it is ensured that the receiver does not erroneously detect very short noise spikes as paths, because they are filtered out.

Expediently, the receiver Is further adapted to calculate a center of gravity for said previously calculated delay profile; and position the search window around said calculated center of gravity.

In an expedient embodiment, the receiver is further adapted to consider multipath components calculated for said transposed window as already estimated when searching at regular time intervals for new multipath components that are not already estimated from one of said delay profiles. In this way it is avoided that the receiver detects the same new multipath component again and again while it is already being processed.

The digital wireless communications system may expediently be a Wideband Code Division Multiple Access system, and in this case the identification code may be a scrambling code for a Common Pilot Channel in the Wideband Code Division Multiple Access system.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

Figure 1:
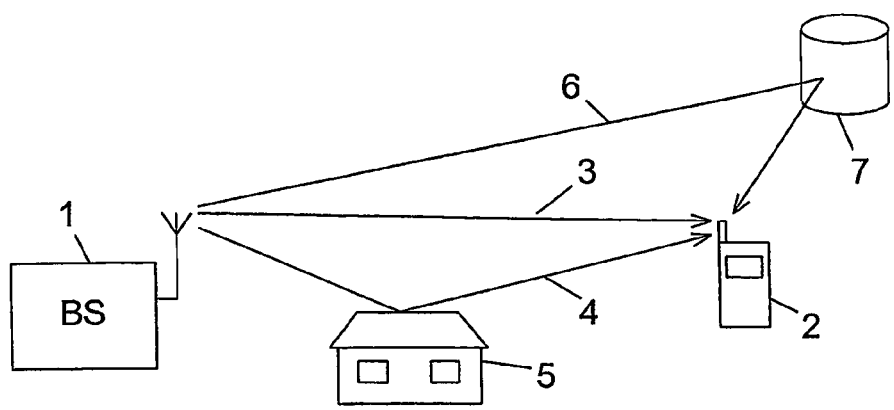
FIG. 1 shows an example of multiple paths between a base station and a mobile station.

FIG. 1 shows a situation in which a base station 1 and a mobile station 2 of a wireless communications system communicate with each other. As an example, a signal transmitted from the base station 1 is received by the mobile station 2. However, the transmitted signal travels along multiple paths from the base station to the mobile station. In this case there is a direct and unobstructed propagation path 3, but in addition to this direct path, reflections from objects in the surroundings cause a number of indirect paths to exist. Two such paths are shown in the figure. One indirect path 4 is reflected from a house 5, while another path 6 is caused by reflection from another building 7.

Since the part of a signal transmitted via one of the indirect paths 4 and 6 has to travel a longer distance to arrive at the mobile station 2, compared to the part of the signal travelling via the direct path 3, multiple instances of the same signal will be received by the mobile station 2 at different times, i.e. with different delays.

Figure 2:
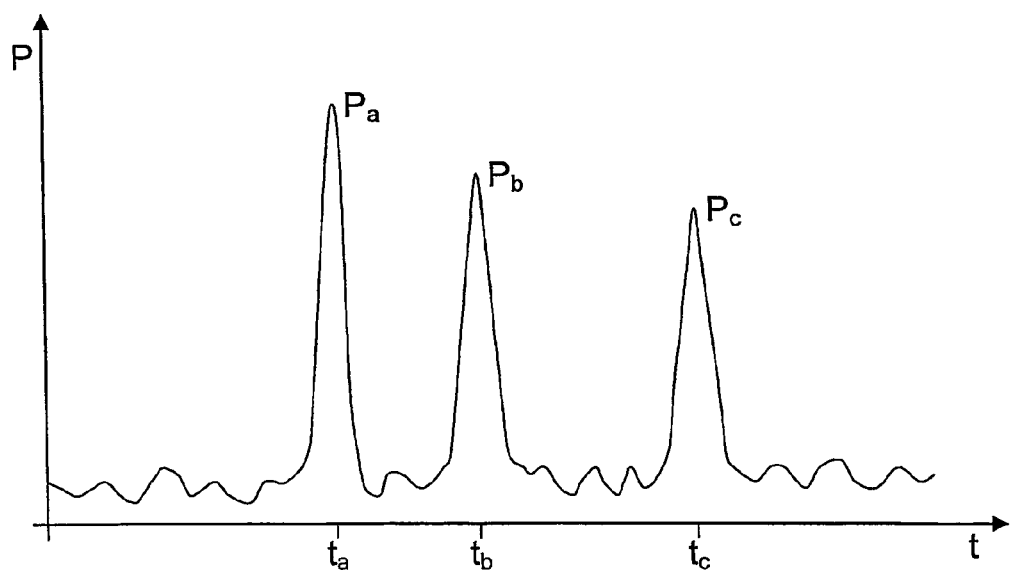
FIG. 2 shows a power delay profile for the paths illustrated in FIG. 1.

Thus, if a pilot signal is transmitted from the base station 1, the power P received at the mobile station 2 as a function of the time t may look as illustrated in FIG. 2, which shows an example of a power delay profile. The power delay profile shows all signals received at the mobile station, including noise and interference signals. However, only the peaks in the power delay profile correspond to the multipath components of the transmitted signal. Together these peaks form the impulse response of the channel. In FIG. 2 the peak $P_a$ received at the time $t_a$ corresponds to the direct path 3 in FIG. 1, while the peaks $P_b$ and $P_c$ received at the times $t_b$ and $t_c$, respectively, correspond to the indirect paths 4 and 6 in FIG. 1. Thus, as an example, it is seen that the delay of the path 6 (corresponding to the peak $P_c$) is larger than the delay of the path 3 (corresponding to the peak $P_a$).

The mobile station 2 and the base station 1 may be adapted for use in e.g. a Code Division Multiple Access (CDMA) system or a Wideband Code Division Multiple Access (WCDMA) system, and in that case the mobile station 2 may use a RAKE receiver, which is capable of identifying and tracking the various multipath signals for a given channel. In this way the energy or power of several multipath components can be utilized in the receiver. As mentioned above, this may be achieved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate. Thus the RAKE receiver requires knowledge of the multipath delays and the values of the channel impulse response for all paths. The signal energy from as many physical paths as possible should be collected.

Although reference is here made to a RAKE receiver in a mobile station, it should be noted that the algorithms described below may be used at any CDMA receiver, i.e. in a mobile station or a base station, and the transmission may be uplink or downlink.

Since the structure of the propagation channel does not remain constant over time, the delays of existing paths change, old paths disappear and new paths appear. The changing delays of all known multipath components should be tracked, and new paths should be discovered quickly after they appear. However, most of the time the delays of newly appeared paths are relatively similar to those of the old, known paths, and thus they may be detected by searching in the same neighbourhood.

Figure 3:
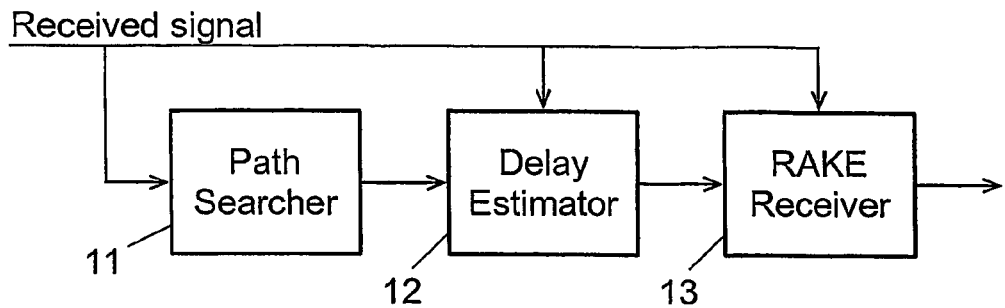
FIG. 3 illustrates the use of a path searcher in combination with a RAKE receiver.

In order to estimate the path delays in the RAKE receiver, the impulse response of the channel could be evaluated repetitively over the whole range of possible delays in the channel, and the resulting delay profile could then be subjected to peak detection and the peak locations reported to the RAKE receiver as the delay estimates. However, the processing and power consumption of executing such a full path searching routine frequently is usually so high that it cannot be realized in a practical system. Therefore, infrequently activated limited-range path searchers are typically used for detecting new paths and, in some implementations, for re-detecting temporarily faded existing paths. This is illustrated in FIG. 3, in which a path searcher 11 is used in combination with a RAKE receiver 13.

The path searcher 11 is a device that periodically computes instantaneous impulse response estimates (complex or power) over a range of delays that only constitutes a fraction of the maximum delay spread allowed by the system. This reduced range of delays is also called a path search window. The complex or power values for a given delay value may be estimated e.g. by correlating the received data for pilot symbols with an appropriately delayed copy of the spreading sequence. Since the path searcher 11 is mainly used to detect only the existence of paths, its output resolution may be lower than that required by the RAKE receiver 13. The RAKE receiver 13 itself uses a general delay estimation algorithm 12, which is able to extract the path positions and find their delays with sufficient accuracy, once they are discovered by the path searcher 11. Thus the path searcher positions the path searcher window so that new paths can be expected to be included in the window. As mentioned, new paths from the same base station will with high probability appear in the vicinity of the currently known paths, and thus the path search window for a new search is normally placed so that it covers the currently known paths. This can be done in different ways. One method is the center of gravity method, which will be described later.

Figure 4:
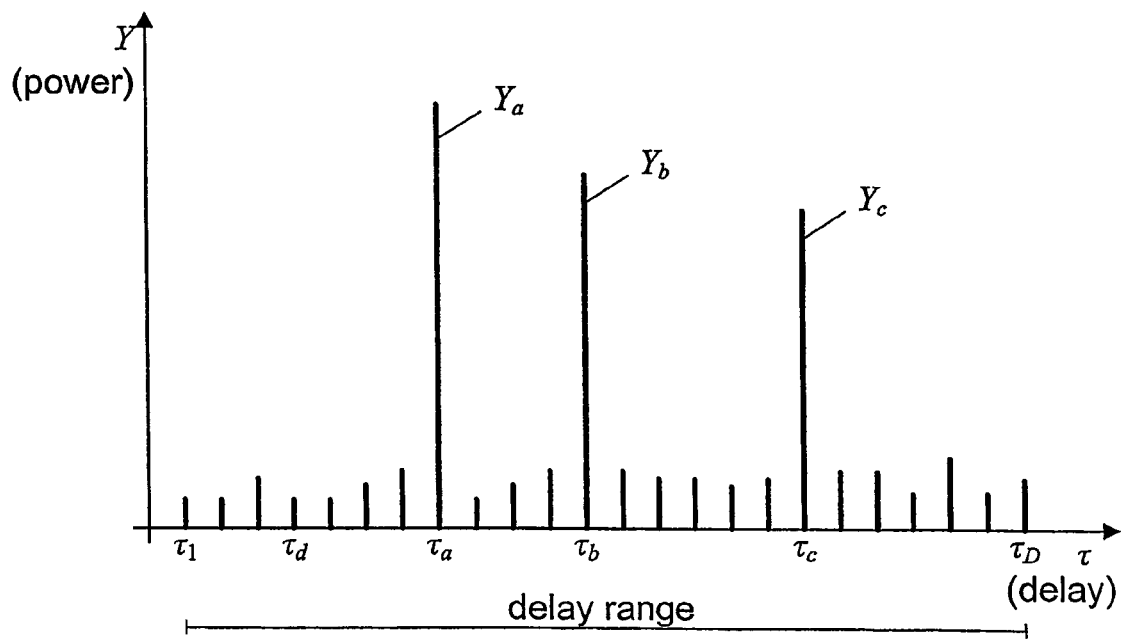
FIG. 4 shows a sampled power delay profile corresponding to the profile shown in FIG. 2.

Typically, the delay profile of the received signal will not be available as a continuous curve as the one illustrated in FIG. 2. Instead, it will consist of a number of sample values. This is illustrated in FIG. 4, which shows a sampled power delay profile corresponding to the continuous delay profile shown in FIG. 2. For each delay value $\tau_d$, where $d=1, \ldots, D$, the corresponding power value $Y_d$ is shown. In this case the available estimates of the power delay profile constitutes a contiguous sequence of equally spaced samples. The power values $Y_a$, $Y_b$ and $Y_c$ at the delay values $\tau_a$, $\tau_b$ and $\tau_c$ correspond to the peaks $P_a$, $P_b$ and $P_c$ shown in FIG. 2.

The CDMA and WCDMA systems described above are cellular systems, and thus a mobile station may communicate with several base stations or cells at the same time. The receiver must thus be able to handle several multipath channels at the same carrier frequency simultaneously. As the mobile station is moving around, it will be necessary to continuously change the set of cells used by the mobile station. Typically, the mobile station will use the cells from which the strongest signals are received. To ensure that this is the case, the signal strength received from already known cells must be monitored, and new cells must be detected. A path searcher as described above is commonly used to monitor the signal strength from a known cell, while a cell searcher may be used for the detection of new cells.

Figure 5:
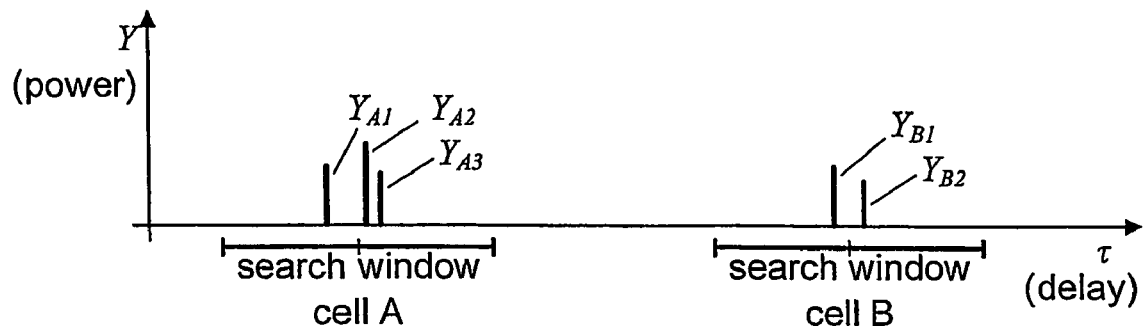
FIG. 5 shows a sampled power delay profile with multipath components from two cells.

The path searcher operates with a path searcher window for each cell that is presently known to the receiver, and a delay profile and the multipath delays are calculated for each of these windows. An example of this is shown in FIG. 5, which shows two groups of multipath components, each belonging to a separate cell and each having its own search window. Three multipath components $Y_{A1}$, $Y_{A2}$ and $Y_{A3}$ belong to a first cell, cell A, and two components $Y_{B1}$ and $Y_{B2}$ to a second cell, cell B.

A path searcher for use in a WCDMA system typically monitors the signal strength based on pilot signals from e.g. the Common Pilot Channel (CPICH). Three signal quality measurements may be performed on the Common Pilot Channel. The Received Signal Strength Indicator (RSSI) is defined as the total received power, including signal and interference, as measured at the antenna connector; the Received Signal Code Power (RSCP) is the received power from the Common Pilot Channel; and $E_c/I_o$ is the ratio of the received energy per PN chip for the Common Pilot Channel to the total transmit power, i.e. $E_c/I_o=RSCP/RSSI$. Especially, $E_c/I_o$ and RSCP inform the network of the quality of a given cell. In practice, RSCP and RSSI are computed, which then give $E_c/I_o$.

To calculate these quality measures for a known cell, the path searcher correlates the received signal with the scrambling code for the cell and the CPICH channelization code, i.e. the CPICH symbols are despread and then accumulated. This is done for a given number of time delays. The strength of the accumulated signal for a given delay $\tau_d$ reflects the power $Y_d$ contained at this time delay. If it is judged to be higher than a specified noise floor, it is said to represent a multipath and its power contributes to the RSCP.

Figure 6:
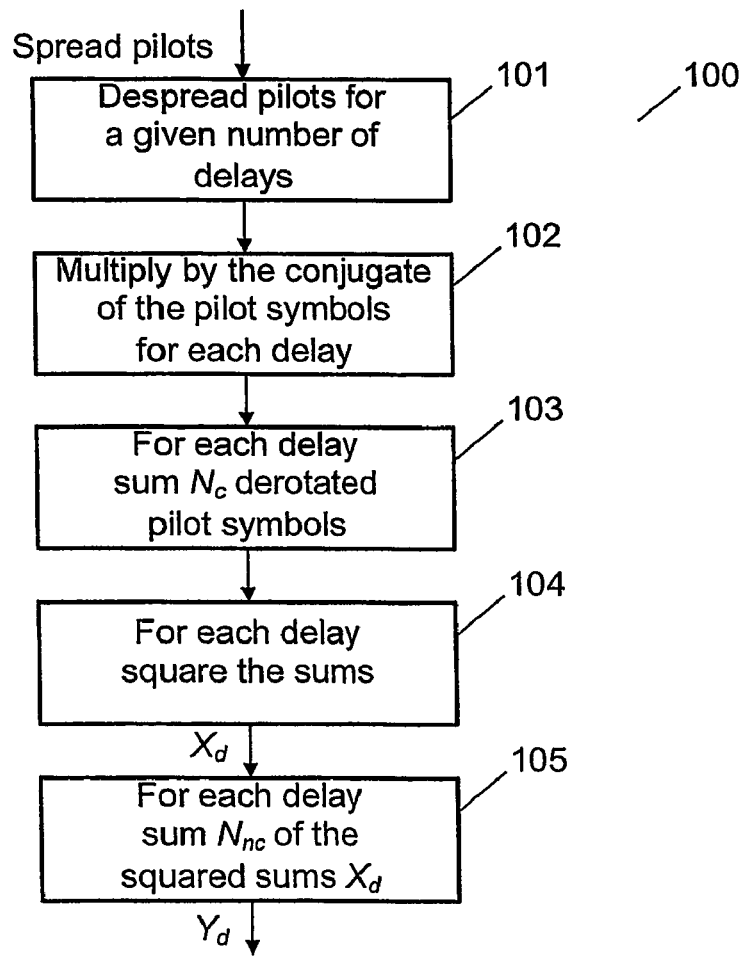
FIG. 6 shows a flow chart illustrating the steps of a part of a path searcher.

These calculations are described in further detail below. A general structure of a part of a path searcher is shown in the flow chart 100 in FIG. 6. In Block 101, we despread the pilots, usually the CPICH, for a given set of time delays. In Block 102, we multiply the received despread pilots by the known complex conjugate of the pilot symbols. This essentially gives an approximation of the radio channel for this time delay. In Block 103, we add a number $N_c$ of these de-rotated pilot symbols. This is called coherent summation and reduces the noise inherent with the de-rotated pilots/radio channel estimates. In Block 104, we square the output of Block 103 for each time delay resulting in the value $X_d$. Finally, in Block 105 a number $N_{nc}$ of the $X_d$ values are summed. The result is the output power value $Y_d$ for the delay with index d. This is called non-coherent summation and the purpose is again to combat noise. Coherent summation is more effective than non-coherent summation in suppressing noise, but also requires that the radio channel does not change during a coherent summation. Typically, the numbers $N_c$ and $N_{nc}$ can be selected so that $1 \leq N_c \leq 10$ and $1 \leq N_{nc} \leq 30$, with $N_c=2$ and $N_{nc}=20$ as recommended values, if measurements are made on the CPICH.

As mentioned, $Y_d$ is the output for the delay with index d. We assume that there are D delays $d=1, \ldots, D$ in the search window, and that the corresponding delays are spread equidistantly. Typically, $80 \leq D \leq 300$, with $D=100$ as a recommended value. Thus the set of power values $Y_d$ constitutes the power delay profile, such as the one shown in FIG. 4. A subset $\Omega_d$ of the power values $Y_d$ can be defined as the subset of the index set $\{1 \ldots D\}$ selecting the $N_d$ smallest $Y_d$ values. Typically, $N_d=D-20$. Each of the remaining scaled values $Y_d/N_{nc}N_c sf$ is denoted as $S_d$, where sf is the spreading factor (sf=256 for the CPICH).

It can then be shown that when using chip resolution between the time delays, RSSI equals $$RSSI = Z = \frac{1}{N_d N_{nc} N_c sf} \sum_{d \in \Omega_d} Y_d.$$

Let $\Omega'_d$ be a subset of the remainder set $\Omega^r_d = \{d; d \in \{1 \ldots D\}$ and $d \notin \Omega_d\}$. We can choose $\Omega'_d$ to consist of the indexes l fulfilling $$\alpha_1 \max_{d \in \Omega^r_d} (Y_d - Z) \leq Y_l - Z \text{ and } Y_l \geq \alpha_2 Z$$

for some constants $\alpha_1$ and $\alpha_2$. Here, $0 \leq \alpha_1 \leq 0.2$, $0 \leq \alpha_2 \leq 5$, and it can be recommended to use $\alpha_1=0.05$ and $\alpha_2=3$. The set $\Omega'_d$ can be seen as containing the delay indexes corresponding to multipath powers. The RSCP can now be computed as $$RSCP = \frac{1}{N_c Sf} \sum_{d \in \Omega'_d} (S_d - Z).$$

Here, Z is interpreted as the noise power that is subtracted from the peak power $S_d$. This is because $S_d$ contains both the noise and signal energy (if it exists) from the multipath delay.

As mentioned, one way for the path searcher to place the path searcher window for a new search for the multipath components of a given cell is the center of gravity (COG) method, which will now be described in further detail. The center of gravity for the time delays is computed as $$\tau = \frac{\sum_{d \in \Omega_d} \tau_d (S_d - Z)}{\sum_{d \in \Omega_d} \tau_d (S_d - Z)}.$$

Here, $\tau_d$ is the time delay corresponding to the index d.

The computed center of gravity values may further be filtered, i.e.

$$\tau^{(n+1)}_{filt} = \lambda \tau^{(n)}_{filt} + (1-\lambda) \tau$$

where the index n enumerates the activations of the path-searcher over time. Typically, $0.6 \leq \lambda \leq 0.99$, $\lambda=0.9$ can be recommended. The new path searcher window can now be positioned with $\tau^{(n+1)}_{filt}$ at its center. Using a window with the delays equidistantly spaced, the time delay $\tau^{(n+1)}_{filt}$ will correspond to the delay index d=D/2. Here, the filtered center of gravity value is used as the center position of the path searcher window, but it should be noted that the window may also be positioned asymmetrically around the center of gravity value.

Figure 7:
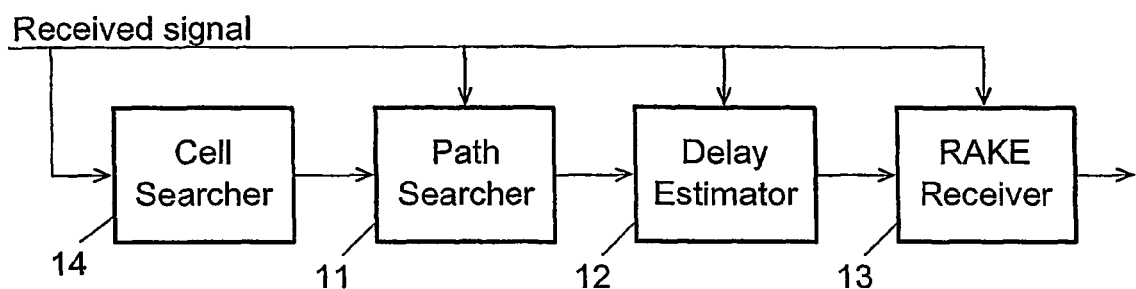
FIG. 7 shows the diagram of FIG. 3 combined with a cell searcher.

In the above text it is described how the path searcher window is positioned and the quality measures calculated for a known cell. However, as mentioned, in a cellular system the receiver must also be able to detect signals from new cells, and this detection may be performed by a cell searcher. This is illustrated in FIG. 7, which shows the diagram of FIG. 3 extended with a cell searcher 14. At regular time intervals the cell searcher 14 checks the received signal for new cells. When a signal of sufficient strength from a new cell appears, it is detected by the cell searcher 14, and the delay of a multipath component for that cell and an identification of the cell (e.g. a scrambling code) are supplied to the path searcher, so that this cell can be included in the path search.

The cell search utilizes different codes transmitted by all cells. In a WCDMA network the CPICH includes a primary synchronization code and a scrambling code. The primary synchronization code is the same for all cells, and it is known to the receiver, while each cell has its own unique scrambling code, which identifies the cell. The cell search correlates the known primary synchronization code against the received signal in order to find a slot boundary for a new cell. Further, accumulation of the correlated signal for a range of delay values, typically at least 2560 chips, may be performed, and the maximum accumulated value is then taken as the slot boundary for a cell.

For a given multipath delay profile for the transmission channel from a new cell, the cell searcher will lock onto one of the multipath components of this profile and deliver the delay of this multipath component as an indication of a new cell to the path searcher. The path searcher will then include the new cell in its operation. There is no guarantee that the cell searcher will not detect the slot boundary of an already known cell. To avoid this situation, the delay locations of the multipath components for the already known cells may be excluded, so that the cell searcher only looks for multipath components that are not already estimated from one of the delay profiles calculated for the known cells. This is called masking out of known cells. The cell searcher also determines the scrambling code of the new cell and delivers this code to the path searcher.

When the path searcher receives the delay value indicating a new cell from the cell searcher, a path searcher window will be centred on this delay, and the position of the path searcher window will then be updated using one of the methods described above, e.g. the center of gravity method in which a center of gravity for the delay profile is computed (and maybe filtered) and the window positioned around the computed center of gravity.

Figure 8:
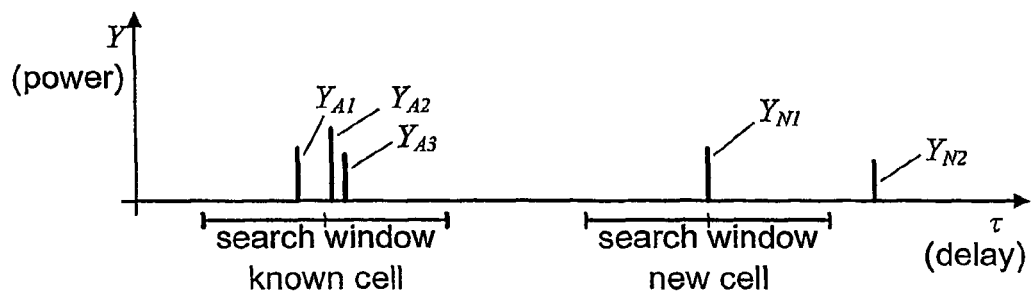
FIG. 8 illustrates a situation where a path searcher window fails to find all relevant paths of a cell.

However, when the spacing between the multipath delays of the transmission channel from the new cell is large, it may be difficult or impossible to position the search window so that all clusters of energy in the delay profile are included. An example of such a situation is illustrated in FIG. 8. Three multipath components $Y_{A1}$, $Y_{A2}$ and $Y_{A3}$ belongs to a known cell, while the two components $Y_{N1}$ and $Y_{N2}$ represent a new cell that has just appeared. In the figure the two new components $Y_{N1}$ and $Y_{N2}$ are spaced 80 chips apart, and the search window used by the path searcher is 100 chips long. If the cell searcher finds the first multipath component, $Y_{N1}$, the search window of the path searcher will be centred over this component as shown, and $Y_{N2}$ will then not be included in the window, although the search window is actually wide enough to include both components. Also subsequent window positions will then be wrong because they will continue to be centred at $Y_{N1}$. Thus the normal center of gravity method of positioning the search window is not sufficient in this situation. As a consequence, the signal strength from this new cell will be reported erroneously because a substantial part of the energy transmitted from the base station of this cell is lost.

Figure 9:
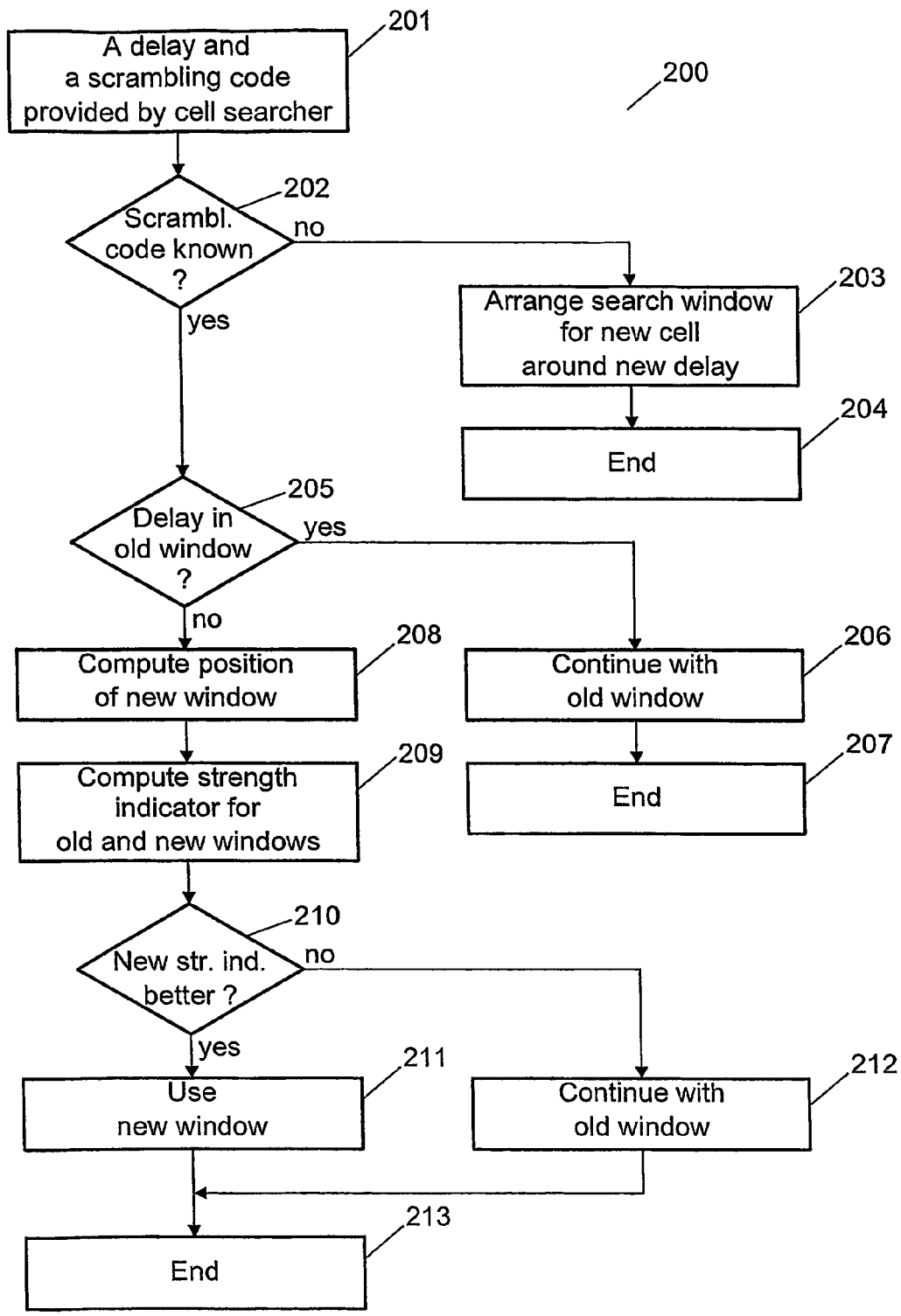
FIG. 9 shows a flow chart illustrating the use of cell searcher information in path searcher window positioning.

A solution to this problem is described below. In the described solution information from the cell searcher is used to update the path searcher window position when the same cell is detected twice by the cell searcher. An example of such a solution is illustrated in the flow chart 200 in FIG. 9. The method of the flow chart is activated in the path searcher each time a delay indicating a new cell is received from the cell searcher.

In step 201 a delay $\tau_{CS}$ and a scrambling code indicating a new cell is received from the cell searcher. The cell search is performed at regular time intervals, e.g. every 4 to 20 frames, and the delay provided to the path searcher corresponds to the largest instantaneous power found among the set of delay values that have not been masked out, because they were already known by the path searcher as multipath components for known cells.

The scrambling code is then checked in step 202. As mentioned before, each cell has its own scrambling code, which thus unambiguously identifies the cell. If the scrambling code provided by the cell searcher has not already been observed by the path searcher, the provided multipath delay actually represents a new cell, which should be handled by the path searcher, and appropriate action is taken in step 203. A search window is arranged for the new cell around the provided delay $\tau_{CS}$ according to predefined protocols as specified in the 3GPP specification. The process of this flow chart is then concluded in step 204.

If, on the other hand, the scrambling code provided by the cell searcher has already been observed by the path searcher, the cell searcher has found a multipath component that belongs to one of the cells that are already tracked by the path searcher. It is then checked in step 205 whether the delay $\tau_{CS}$ provided by the cell searcher is located within the path searcher window that is currently used for this cell (the "old" window) or not. If delay $\tau_{CS}$ is within the old window there is no need to change the window. The new multipath component will automatically be included in the delay profile by the path searcher in the next search. Thus in step 206 the path searcher keeps the old window, and the process is concluded in step 207.

If the delay $\tau_{CS}$ provided by the cell searcher is not located within the currently used path searcher window for this cell, we are in a situation where it could be advantageous to modify the position of the path searcher window for that cell, since a multipath component obviously exists outside the currently used window. Thus in step 208 the position for a transposed window, which will here be called the "new" window, is calculated. If $\tau_{old}$ denotes the center of the old or current path searcher window, while $\tau_{CS}$ as before denotes the time location of the delay provided by the cell searcher, the new (transposed) path searcher window can be positioned at $$\tau_{new} = \begin{cases} \tau_{CS} + 0.5\Delta - \tau_{shift}, & \text{for } \tau_{CS} < \tau_{old} \\ \tau_{CS} - 0.5\Delta + \tau_{shift}, & \text{for } \tau_{CS} > \tau_{old}, \end{cases}$$

where $\tau_{shift}$ is selected so that $4 \leq \tau_{shift} \leq 20$ chips with $\tau_{shift}=10$ chips as a preferred value, and $\Delta$ is the time span in chips of the path searcher window. Essentially, this means that the delay $\tau_{CS}$ will always be located at the border of the new window. $\tau_{shift}$ ensures that it is located within the border. In this way, we strike a balance between choosing as much of the delays from the old window, and at the same time including the delay $\tau_{CS}$.

Having found the position for the new window, we can now in step 209 calculate the signal strength indicator for the old as well as the new path searcher window. The signal strength indicator can be the RSCP or $E_c/I_o$ values, and for both windows they are calculated as described above. Thus, if the RSCP is used, the values calculated for the two windows can be designated as $RSCP^{(old)}$ and $RSCP^{(new)}$.

The two strength indicators $RSCP^{(old)}$ and $RSCP^{(new)}$ calculated for the old and the new window, respectively, are then compared in step 210 to see which window position will be the best to use. If $RSCP^{(new)} \geq \alpha RSCP^{(old)}$, it is suggested to use the new window position from here on (step 211); otherwise the old, i.e. the current, window position is maintained (step 212). Typically, the value $\alpha=1$ is used, which means that we select the window position having the highest RSCP value, but more generally $1 \leq \alpha \leq 2$ can be used. Similar calculations are performed when $E_c/I_o$ is used as the signal strength indicator. Finally, the process is concluded in step 213.

Figure 10:
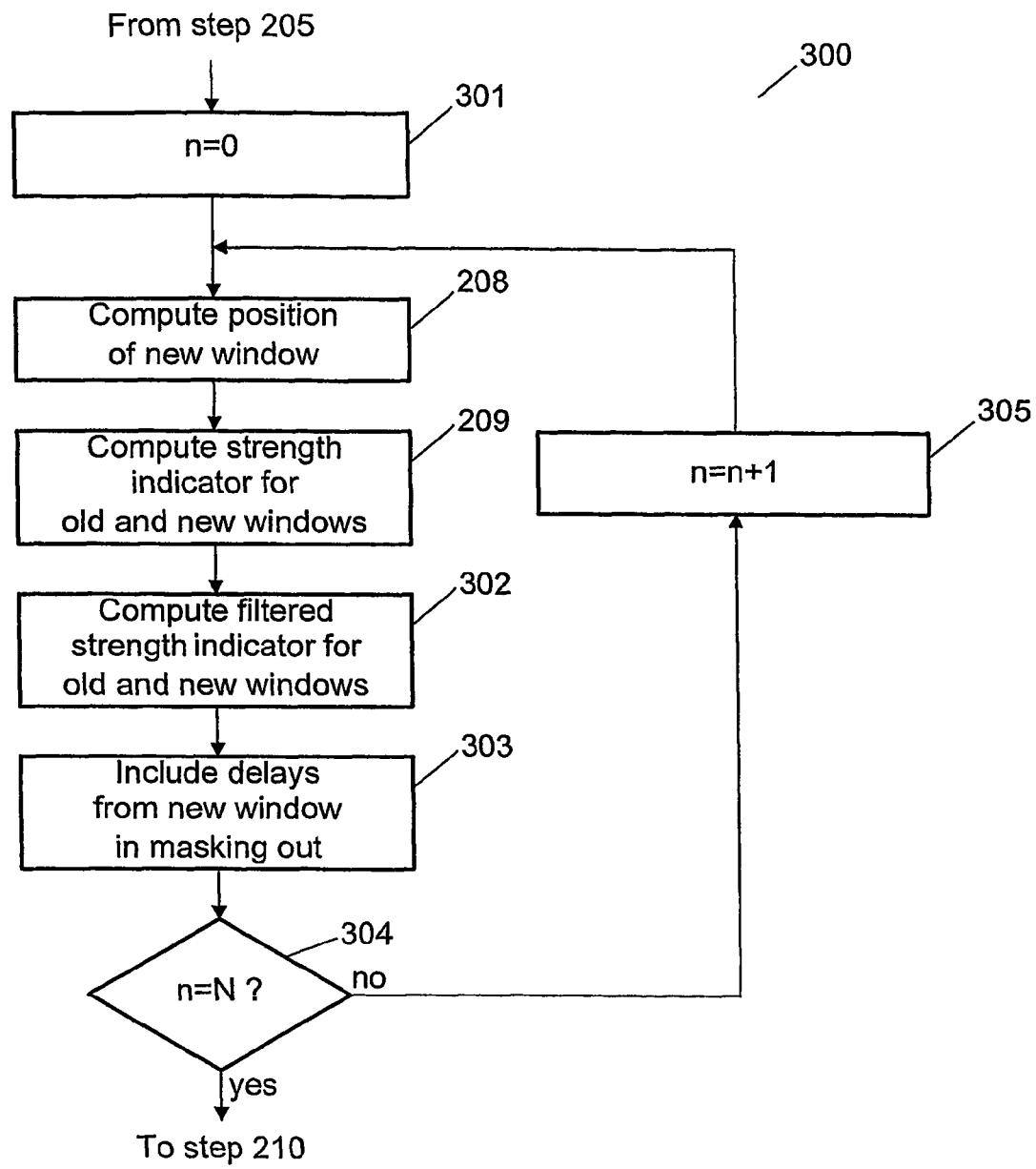
FIG. 10 shows a flow chart illustrating the use of filtered signal strength indicators.

The calculated signal strength indicator values for the two window positions may also be filtered over a number of samples before a decision is taken. This means that steps 208 and 209 are repeated a number of times before step 210 is performed. This is illustrated in the flow chart 300 in FIG. 10. If the two steps are performed N times, i.e. for $n=0, \ldots, N-1$ the process of this flow chart is initialized in step 301 by setting $n=0$. In steps 208 and 209 the position of the new window and the strength indicator RSCP or $E_c/I_o$ (for the old as well as the new window) are computed as described above, and in step 302 filtered versions of RSCP or $E_c/I_o$ are calculated. The first time, i.e. for $n=0$, the filtered values are initialized by just using the first unfiltered (instantaneous) values, i.e. when RSCP is used as strength indicator:

$$RSCP^{(old)}_{filtered,0} = RSCP^{(old)}_0, \text{ and}$$

$$RSCP^{(new)}_{filtered,0} = RSCP^{(new)}_0,$$

where $RSCP^{(old)}_0$ and $RSCP^{(new)}_0$ are the instantaneous sample values.

For $n=1, \ldots, N-1$ the filtered values are calculated as:

$$RSCP^{(old)}_{filtered,n} = \lambda RSCP^{(old)}_{filtered,n-1} + (1-\lambda) RSCP^{(old)}_n, \text{ and}$$

$$RSCP^{(new)}_{filtered,n} = \lambda RSCP^{(new)}_{filtered,n-1} + (1-\lambda) RSCP^{(new)}_n,$$

where again $RSCP^{(old)}_n$ and $RCSP^{(new)}_n$ are the instantaneous sample values.

The same type of filtering applies to the $E_c/I_o$ values if it is chosen to use them instead of the RSCP values. The value $\lambda$ is typically selected so that $0.8 \leq \lambda \leq 0.99$ with $\lambda=0.98$ as a preferred value. As mentioned, the values are filtered over N samples. Typically, N can be selected to be approximately $1/(1-\lambda)$. Steps 304 and 305 ensure that the values are filtered over N samples.

It is noted that the new and old window locations may be subject to updates from one sample to the next one. The basis for such updates could come from the peak magnitudes and their locations given by the old and new windows. For example, each window could strive for placing its center at its filtered center of gravity. The N samples from the old and new window should preferably be spaced as uniformly as possible and span an equal time interval. As an example, the samples can be spaced 5 to 10 frames apart.

While collecting the N samples from the old and new window, the delays (i.e. multipath components) produced by the path searcher for both windows may be used in the masking for the cell searcher as shown in step 303, so that the cell searcher does not continue to report the same cell during the calculations. Should the same cell nevertheless be reported by the cell searcher during the calculations, the calculations are just continued because we are already in the process of adjusting the window position for that cell. The report of a cell from the cell searcher initiates the flow chart 200 once again in parallel to the one that is already running, and therefore a step checking if samples are already being collected for the reported cell can be inserted after step 205. If that is the case, the process of the new flow chart activation can be concluded since the process is already running.

Should another new cell be reported by the cell searcher during the calculations, a similar process can be initiated for that cell and performed in parallel with the present calculations, and if a new (not yet known) cell is reported during the calculations, the necessary steps to include this cell in the path searcher can also be initiated and performed in parallel with the present calculations.

As mentioned above, the proposed solution uses the cell searcher to update the path searcher window position if the same cell is detected twice by the cell searcher. The best results are obtained when the cell searcher is used a large portion of the time, e.g. every 4 to 20 frames, which will often be the case. When the cell searcher is active a large part of the time, and when the path searcher power delay profile is generated from a single window for each cell, the invention provides a low complexity method for positioning the path searcher window. It efficiently combines the hardware blocks for the cell search and the path search to produce an improved window placement for the path searcher.

Although a preferred embodiment of the present invention has been described and shown, the invention is not restricted to it, but may also be embodied in other ways within the scope of the subject-matter defined in the following claims.

What is claimed is:

1. A method of detecting multipath components in time-varying fading radio channels in a digital wireless communications system in which individual multipath components of a signal transmitted through a channel are received with individual delays ($T_a$, $T_b$, $T_c$) within a range of possible delay values, and in which signals transmitted through a given channel comprise an identification code identifying that channel, the method comprising the steps of:

calculating repetitively for each of a number of known channels a delay profile indicating a magnitude (Y) for each of a number of individual delay values in a search window constituting a subset of said range of possible delay values and being positioned based on at least one previously calculated delay profile for the corresponding channel;

estimating from said delay profiles the delays of multipath components for each known channel;

calculating from said delay profiles a signal strength indicator for each known channel; and searching at regular time intervals for new multipath components that are not already estimated from one of said delay profiles;

comparing, when a new multipath component is found, the identification code of the new multipath component to the identification codes of said known channels;

calculating, if the identification code of the new multipath component is identical to the identification code of one of the known channels, a delay profile and a corresponding signal strength indicator for a transposed window obtained by transposing the search window of that known channel to include said new multipath component;

comparing the signal strength indicator calculated for that known channel to the signal strength indicator calculated for the transposed window, and replacing, if the signal strength indicator calculated for the transposed window is larger than the signal strength indicator calculated for that known channel multiplied by a factor, the signal strength indicator for that known channel by the signal strength indicator for the transposed window.

2. The method according to claim 1, wherein the factor equals one.

3. The method according to claim 1, further comprising the step of replacing, if the signal strength indicator for that known channel is replaced by the signal strength indicator for the transposed window, the search window for that known channel by the transposed window.

4. A receiver adapted to detect multipath components in time-varying fading radio channels in a digital wireless communications system in which individual multipath components of a signal transmitted through a channel are received with individual delays ($T_a$, $T_b$, $T_c$) within a range of possible delay values, and in which signals transmitted through a given channel comprise an identification code identifying that channel, comprising:

a means for calculating repetitively for each of a number of known channels a delay profile indicating a magnitude (Y) for each of a number of individual delay values in a search window constituting a subset of said range of possible delay values and being positioned based on at least one previously calculated delay profile for the corresponding channel;

a means for accepting said delay profiles and estimating from said delay profiles the delays of multipath components for each known channel and calculating from said delay profiles a signal strength indicator for each known channel;

a means for searching at regular time intervals for new multipath components that are not already estimated from one of said delay profiles;

a means for comparing, when a new multipath component is found, the identification code of the new multipath component to the identification codes of said known channels;

a means for calculating, if the identification code of the new multipath component is identical to the identification code of one of the known channels, a delay profile and a corresponding signal strength indicator for a transposed window obtained by transposing the search window of that known channel to include said new multipath component;

a means for comparing the signal strength indicator calculated for that known channel to the signal strength indicator calculated for the transposed window, and a means for replacing, if the signal strength indicator calculated for the transposed window is larger than the signal strength indicator calculated for that known channel multiplied by a factor, the signal strength indicator for that known channel by the signal strength indicator for the transposed window.

5. The receiver according to claim 4 wherein the factor equals one.

6. The receiver according to claim 4 further comprising a means for replacing, if the signal strength indicator for that known channel is replaced by the signal strength indicator for the transposed window, the search window for the known channel by the transposed window.

* * * * *

UNITED STATES PATENT AND TRADEMARK OFFICE
CERTIFICATE OF CORRECTION

PATENT NO. : 7,715,464 B2
APPLICATION NO. : 10/595115
DATED : May 11, 2010
INVENTOR(S) : Jonsson et al.

It is certified that error appears in the above-identified patent and that said Letters Patent is hereby corrected as shown below:

In Column 11, Lines 17-20, delete "$\tau = \dfrac{\sum\limits_{d\in\Omega_d} \tau_d(S_d - Z)}{\sum\limits_{d\in\Omega_d} \tau_d(S_d - Z)}.$" and insert -- $\tau = \dfrac{\sum\limits_{d\in\Omega'_d} \tau_d(S_d - Z)}{\sum\limits_{d\in\Omega'_d} \tau_d(S_d - Z)}.$ --, therefor.

Signed and Sealed this

Seventh Day of September, 2010

David J. Kappos
*Director of the United States Patent and Trademark Office*